F. L. BARBER.
JOURNAL BOX.
APPLICATION FILED MAR. 7, 1912.
1,118,621.
Patented Nov. 24, 1914.
4 SHEETS—SHEET 1.
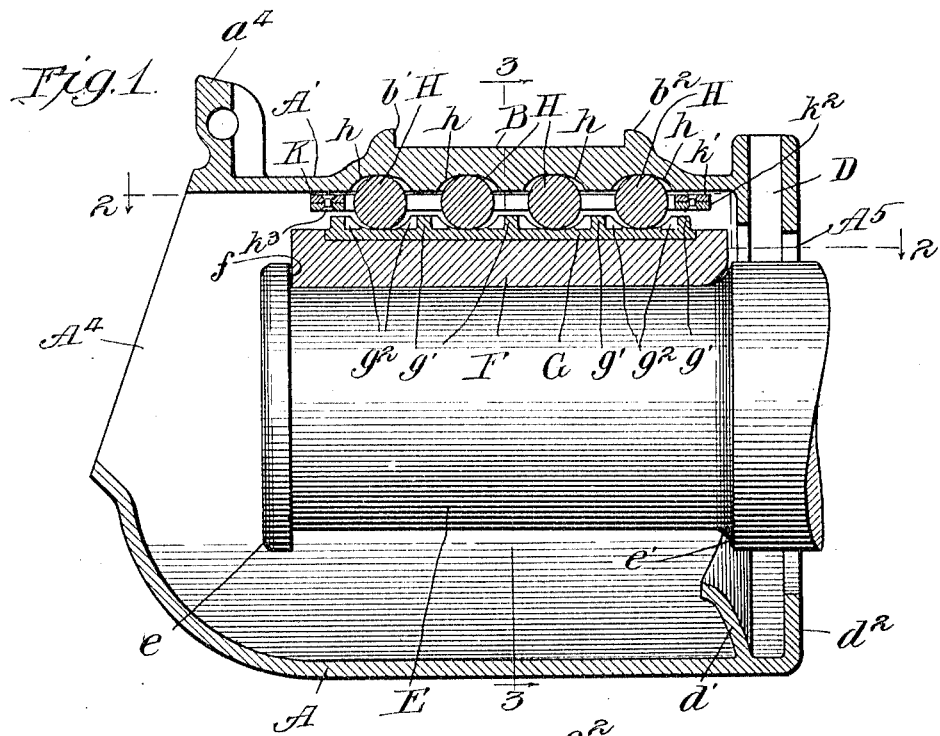
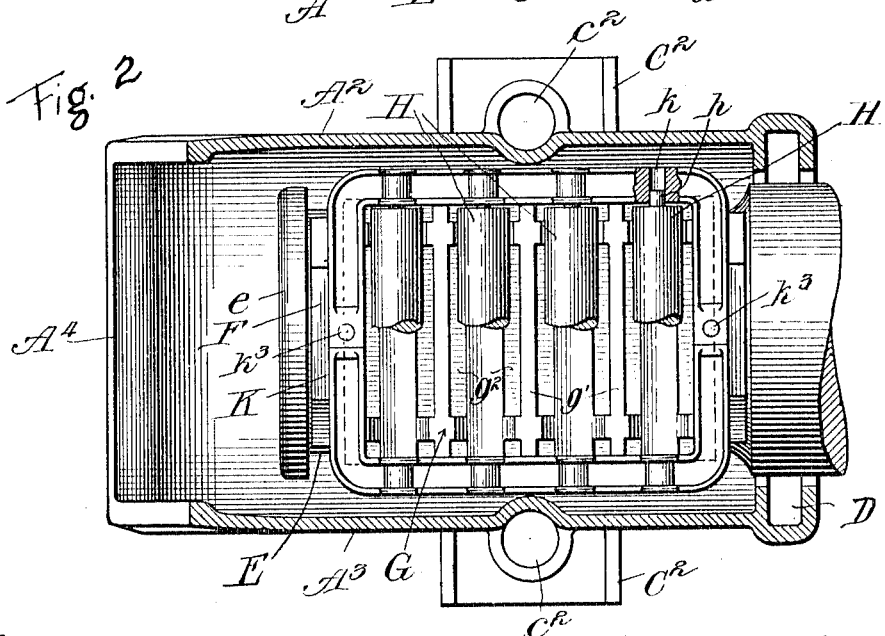

F. L. BARBER.
JOURNAL BOX.
APPLICATION FILED MAR. 7, 1912.
1,118,621.
Patented Nov. 24, 1914.
4 SHEETS—SHEET 2.
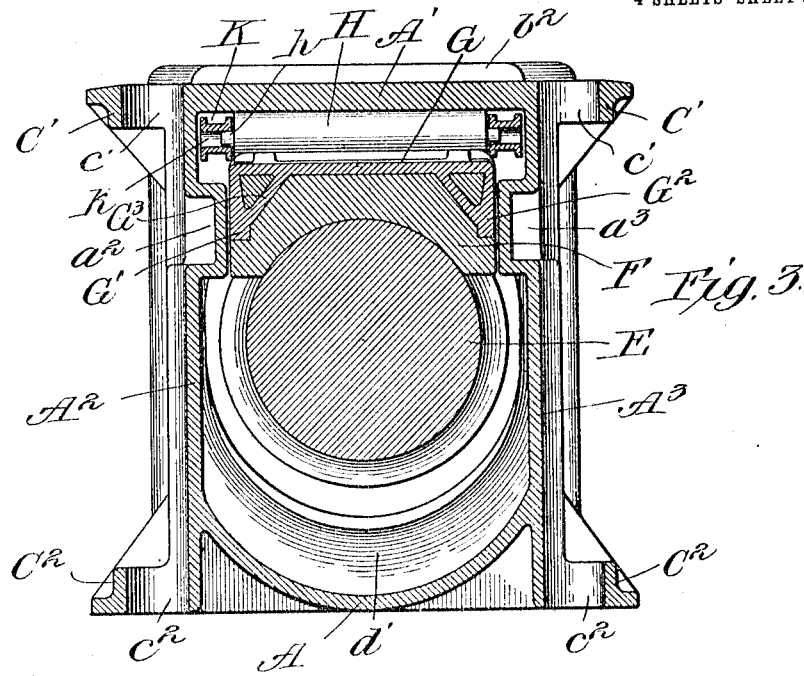
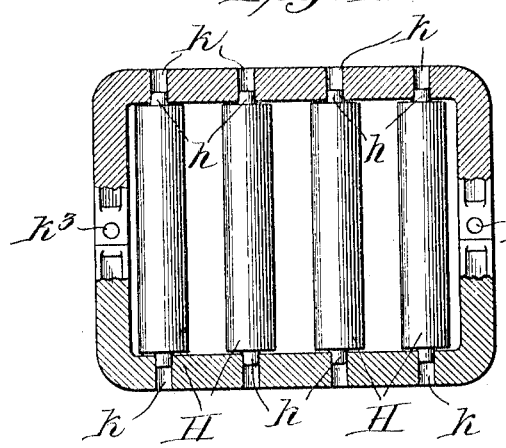
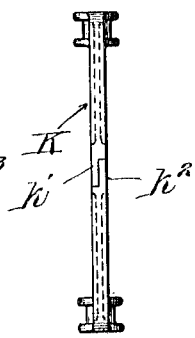

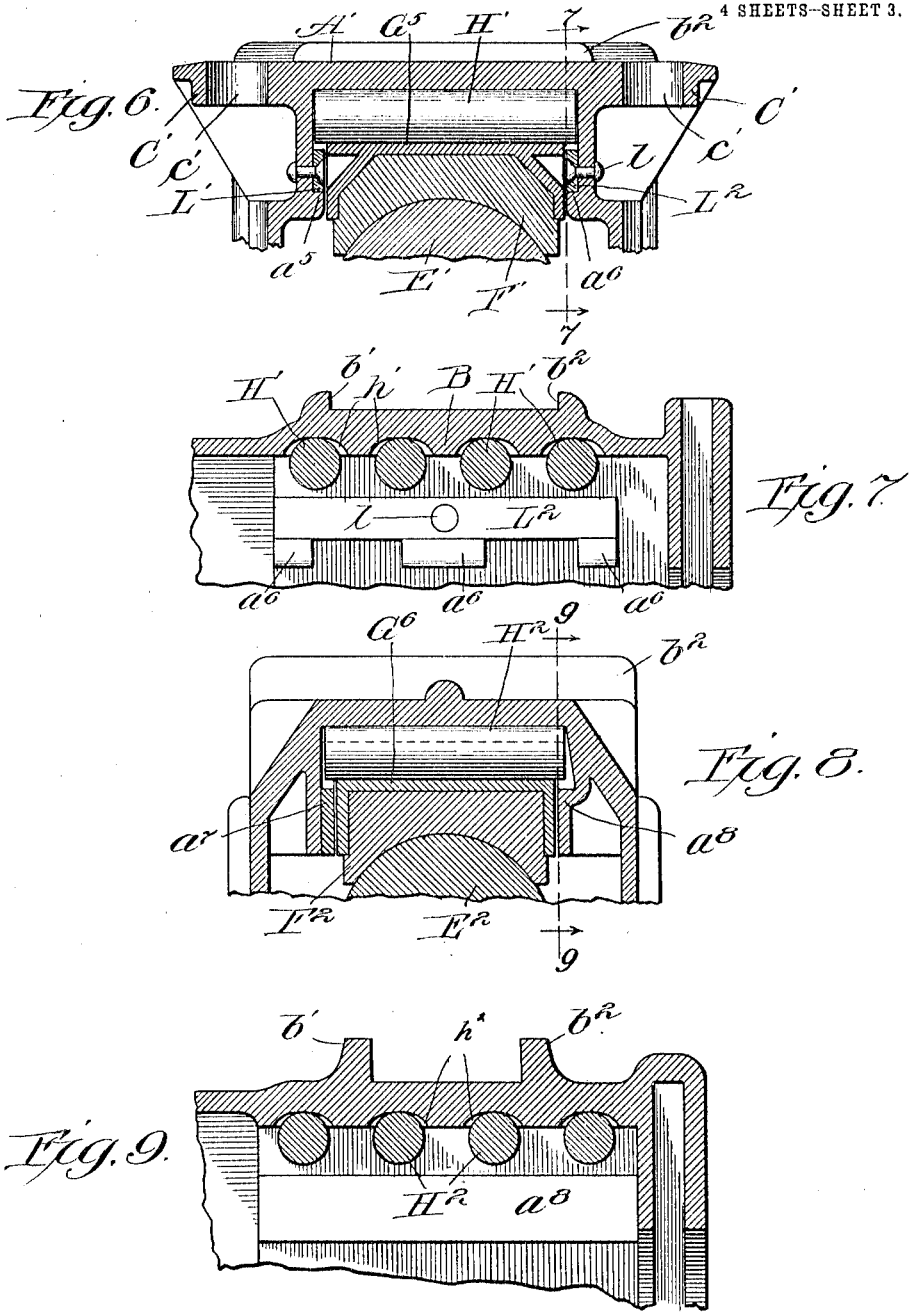

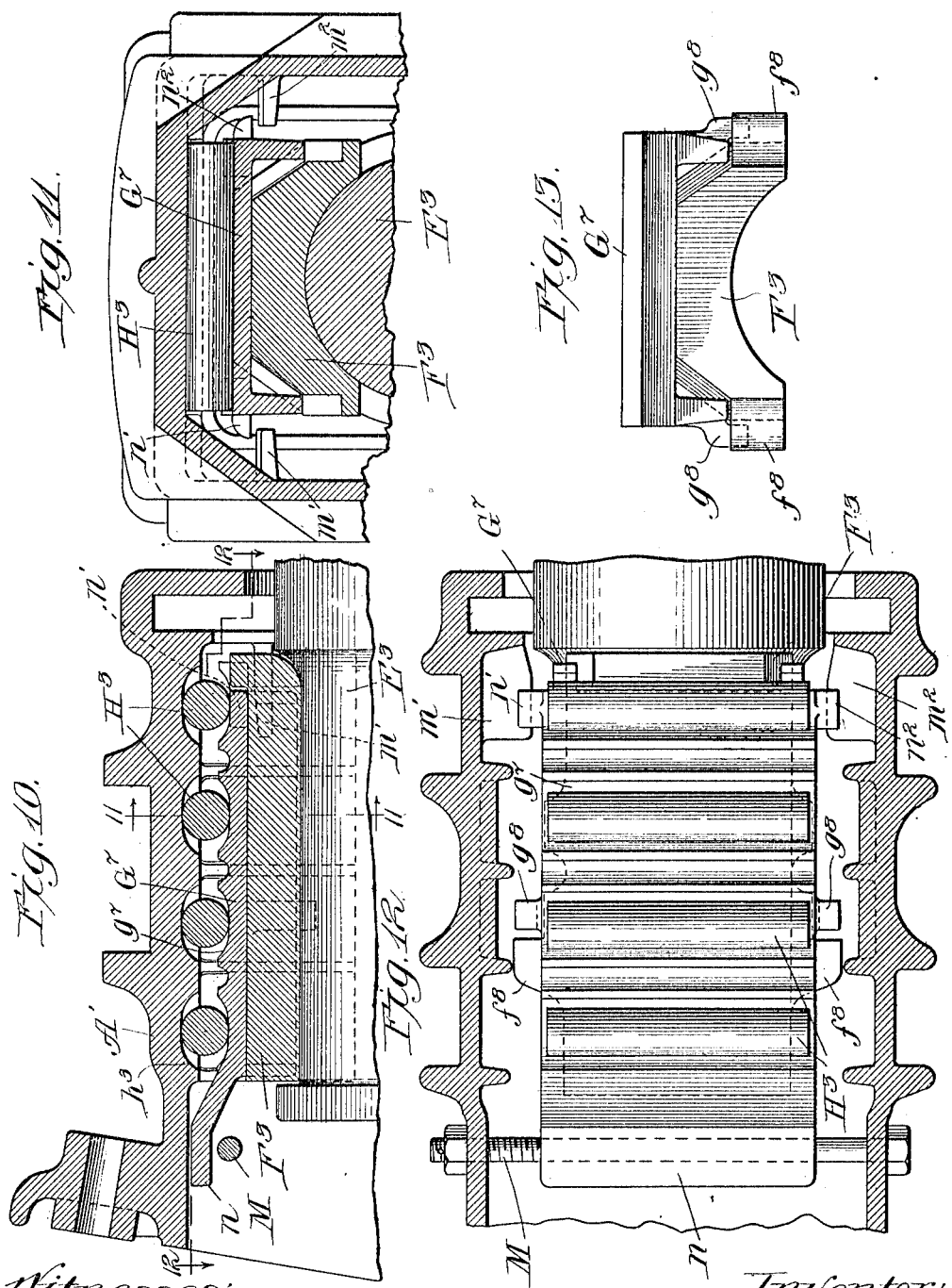

UNITED STATES PATENT OFFICE.

FRANKLIN L. BARBER, OF CHICAGO, ILLINOIS, ASSIGNOR TO STANDARD CAR TRUCK COMPANY, A CORPORATION OF NEW JERSEY.

JOURNAL-BOX.

1,118,621.                Specification of Letters Patent.     Patented Nov. 24, 1914.

Application filed March 7, 1912. Serial No. 682,128.

*To all whom it may concern:*

Be it known that I, FRANKLIN L. BARBER, a citizen of the United States, residing at Chicago, in the county of Cook and State of Illinois, have invented certain new and useful Improvements in Journal-Boxes, of which the following is a specification.

My invention relates in general to car trucks, and more particularly to improvements in journal boxes for car trucks.

The bodies of railroad cars tend to swing laterally when curves in the tracks change the direction of movement of the cars. The suddenness and force of this lateral movement increases with the speed and weight of the cars and communicates a severe strain to the wheel flanges, which, through contact with the rails, resist the lateral movement of the cars. It is, therefore, necessary that a car truck should comprise parts capable of slight lateral relative movement in order that the lateral swing of the ends of the cars supported by the trucks may not force the wheel flanges against the rail heads with such force as to subject the flanges to excessive wear or render liable the derailment of the wheels.

Heretofore in some types of car trucks the wheel flanges have been protected from excessive lateral strain by supporting the truck bolster upon the side frames through connections which permit a lateral movement of the bolster relatively to the side frames sufficient to reduce or gradually absorb the lateral thrust of the car ends before it is communicated to the wheel flanges. Car trucks have also been designed in which the journal boxes are mounted in the side frames, so as to yield laterally and, during such lateral play, to exert a lifting action upon the side frames and through them upon the car, thereby effectively resisting the lateral movement of the car during the slight movement of the journal boxes relatively to the truck side frames.

The primary object of my invention is to provide a journal box in which a lateral movement takes place between the box and journal bearing therein upon which the box rests, and during such lateral movement between the journal box and bearing a lifting action is exerted through the journal box to the truck frame and car body, the extent of such lateral movement and lifting action being sufficient to cushion the lateral movement of the car body and thereby protect the wheel flanges from injury and wear.

A further object of my invention is to provide a journal box which will permit the requisite vertical movement thereof relatively to the surrounded axle and will at the same time be capable of containing an increased quantity of lubricating oil.

A still further object of my invention is to provide a journal box which will be simple in construction, comparatively inexpensive in manufacture and durable in use, and which will afford a lateral yielding connection between the car body and wheels.

My invention will be more fully described hereinafter with reference to the accompanying drawings, in which the same is illustrated as embodied in several convenient and practical forms, and in which—

Figure 1 is a central vertical section through one embodiment of my improved journal box, the axle journal being shown in elevation; Fig. 2, a horizontal sectional view on line 2, 2, Fig. 1, the rollers being shown partly in plan and partly broken away; Fig. 3, a central vertical section on line 3, 3, Fig. 1; Fig. 4, a plan view of the rollers and their supporting cage removed from the journal box; Fig. 5, an end elevational view of the roller cage; Fig. 6, a cross sectional view of the upper portion of a journal box embodying a modified form of my invention; Fig. 7, a central longitudinal section on line 7 7, Fig. 6; Figs. 8 and 9, views similar to Figs. 6 and 7, showing another modified form of my invention; Fig. 10, a central vertical section through the upper half of still another embodiment of my improved journal box; Fig. 11, a cross sectional view on line 11 11, Fig. 10; Fig. 12, a sectional plan view on line 12 12, Fig. 10; and Fig. 13, an end elevation of the journal bearing and journal bearing wedge removed from the journal box and axle journal.

Similar reference characters are used to designate similar parts in the several figures of the drawings.

Referring particularly to Figs. 1 to 5, inclusive, reference letter A indicates a journal box of the M. C. B. type. B designates the bearing on the top $A'$ of the journal box for the arch bar of the truck frame, ribs $b'$ and $b^2$ being provided to engage the opposite edges of the arch bar. $C'$ and $C^2$ indicate pairs of ears projecting laterally in opposite directions from the side walls $A^2$ and $A^3$ of the journal box adjacent the top and bottom thereof. The ears are provided with holes $c'$ and $c^2$ through which extend journal box bolts for securing the journal box to the arch bar and tie bar of the truck side frames. $A^4$ designates the usual opening through the outer wall of the journal box to permit access to the interior thereof, while $a^4$ designates a bracket for supporting the journal box lid. My invention does not reside in a journal box of the specific construction above described, but may be embodied in any suitable form of journal box. D indicates the usual space for a dust-guard to closely surround the axle. $d'$ and $d^2$ designate the flanges which form the space D for the dust-guard. The inner flange $d'$ is curved toward the center of the journal box and extended upwardly to a level somewhat higher than the top of the flange $d^2$. The increased height of the flange $d'$ does not interfere with the jacking up of the journal box to the usual extent, inasmuch as it vertically alines at its upper edge with the curved shoulder $e'$ formed on the axle where it is reduced in diameter to form the journal E. The increased height of the flange $d'$, permitted by curving it toward the center of the journal box, enables a greater quantity of lubricating oil to be retained in the bottom of the journal box than is possible when the inner flange of the dust-guard space extends vertically, as is usual in journal boxes. F designates the journal bearing, which is curved transversely to conform to the curvature of the journal E of the axle and is of a length longitudinally to fit between the shoulder $e'$ and collar $e$ on the end of the journal. G designates the journal wedge which overlies and is secured to the journal bearing F. The journal wedge is provided with a series of spaced ribs $g'$ extending transversely thereof, and between adjacent ribs $g'$ are formed pairs of spaced lugs $g^2$. The upper surfaces of the lugs $g^2$ are concaved so as to form a pair of roller seats between adjacent ribs $g'$ on the upper surface of the wedge G.

A series of rollers H are supported upon the concave seats formed on the upper surface of the wedge and underlie similar concave seats $h$ formed in the under surface of the top wall $A'$ of the journal box. In order that the series of rollers H may be conveniently inserted and removed, cage K may be provided, in the opposite side portions of which are formed bearings $k$ for the trunnions $h$ on the opposite ends of the rollers. The cage K may be conveniently constructed, as shown in detail in Figs. 4 and 5. The cage is formed of two parts having overlapping end portions $k'$ and $k^2$ through which pass suitable fastening devices, such, for instance, as a screw $k^3$. The bearings for the roller trunnions are spaced apart, to correspond with the concave roller seats, thereby serving to retain the rollers in proper relative positions while being inserted and removed and also while in operation.

I preferably secure the journal bearing to the wedge by first forming the wedge of cast malleable iron, or other suitable material, and then casting thereon the journal bearing of brass, bronze, or other suitable material. In order to maintain a secure union between the bearing and wedge, the latter may be provided with side flanges $G'$ and $G^2$ and also with diagonal braces $G^3$ around which the metal of the bearing is cast.

The rollers with their surrounding cage are of a size to pass inwardly and outwardly through the upper portion of the usual opening $A^4$ of the standard journal box, and, in order to facilitate the removal and insertion of the rollers, substantially horizontal shoulders $a^2$ and $a^3$ are formed in or secured to the inner surfaces of the side walls of the journal box in position to underlie and support the rollers when the side frame is jacked up and the journal box thereby elevated above the axle journal and journal bearing and wedge resting thereon. The position of the shoulders $a^2$ and $a^3$ is such that they will support the rollers when the axle box is elevated around the axle the distance permitted by the opening through which the axle extends, so that the upper surfaces of the rollers will then be disengaged from their seats in the under surface of the top wall of the journal box. The rollers may consequently be moved laterally along the underlying supporting shoulders through the opening in the journal box, and also inserted in the same manner in a position between their seats in the wedge and under surface of the top wall of the journal box.

The operation of my improved journal box will be obvious to those skilled in the art from the foregoing description.

Lateral movement of the end of the car in either direction will be communicated to the truck frame and the journal box, while the wedge and journal bearing will be held against a corresponding movement through the engagement of the ends of the bearing with the collar on the outer end of the axle journal and with the curved shoulder between the journal and adjacent portion of the axle. The lateral movement of the journal box will, therefore, cause a movement thereof relatively to the axle journal, such movement being permitted by the series of rollers interposed between the journal wedge and top wall of the journal box. The curvature of the concave roller seats is such as to permit a slight rolling movement of the rollers in either direction from their normal central position, and during such rolling action in either direction a lifting action will be exerted upon the journal box by reason of the inclined surfaces of the roller seats. The wheel flanges are consequently protected from excessive wear or injury which would result from the direct communication to them of the tendency of the car body to move laterally, inasmuch as the rollers constitute a yielding connection between the truck frame and axles, which during its yielding absorbs or dissipates the lateral movement of the car body relatively to the rails.

Referring to Figs. 6 and 7, reference character E' designates a portion of the axle journal and F' the journal bearing. G⁵ designates the journal wedge and H' the series of rollers interposed between concave seats on the upper surface of the wedge G⁵ and the under surface of the top wall A' of the journal box. In these figures, as in Figs. 1 to 5, reference character C' designates the laterally projecting ears on the side walls of the journal box provided with holes c' in which pass the usual journal box bolts. $a^5$ and $a^6$ designate lugs projecting inwardly along the inner surfaces of the side walls of the journal box upon which rest strips L' and L² secured to the side walls of the journal box by suitable fastening devices, such as rivets $l$. In the form of my invention shown in these figures, the series of rollers are not supported in a cage, but operate independently of each other. The ends of the individual rollers overlie the strips L' and L² and are supported by them when the journal box is elevated with respect to the axle and journal wedge and are thereby retained within the journal box. These strips are located at such a level with respect to the usual opening in the outer wall of the journal box as to prevent the rollers passing through such opening when the journal box is elevated relatively to the axle. In order to locate the rollers above the strips L' and L², one of the strips is removed so that the ends of the rollers opposite such removed strip may be located above the strip which is in position, after which the rollers are individually swung upwardly into position within the concave seats h' and the removed strip then placed in position above the lugs $a^6$ and secured to the side wall of the journal box by the rivet $l$.

In Figs. 8 and 9 I have shown a slightly different embodiment of my invention, in which E² indicates the upper portion of the axle journal and F² the journal bearing. G⁶ indicates the wedge in the upper surface of which are formed concave seats for the series of rollers H². The ends of the rollers overlie shoulders $a^7$ and $a^8$, the latter of which is formed integrally with the inner surfaces of the side walls of the journal box, such shoulders serving to support the rollers when the journal box is elevated above the axle. The rollers are inserted by moving the strip $a^7$ and placing the opposite ends of the rollers above the integral shoulder $a^8$, after which they are swung upwardly into engagement with the concave seats $h^2$, when the strip $a^7$ is located in position beneath the overlying ends of the rollers and secured to the adjacent side wall of the journal box.

In the embodiment of my invention shown in Figs. 10 to 13, inclusive, E³ indicates the axle journal, F³ the journal bearing and G⁷ the journal bearing wedge. The rollers H³ are located in the opposing concave seats $g^7$ and $h^3$ formed in the upper surface of the wedge and under surface of the top wall A' of the journal box, respectively. The wedge is retained in position to support the rollers in proper relation with the opposed concave seats by means of a pair of lugs n' and n² projecting laterally from the rear end of the wedge G⁷ and overlying lugs m' and m² projecting inwardly from the side walls of the journal box adjacent the rear thereof. The outer end of the wedge is provided with an upwardly inclined lip n which overlies and is supported upon the transverse bolt M extending through the side walls of the journal box. The position of the pair of lugs m' and m² and the bolt M are such that the wedge is supported sufficiently close to the under surface of the top wall of the journal box to prevent the rollers H³ from becoming disengaged from the concave seats when the journal box is elevated relatively to the axle.

In the embodiment of my invention shown in Figs. 10 to 13, the journal bearing F³ is not cast upon the wedge G⁷, but is held in operative relation thereto when in position upon the axle journal by means of the side flanges on the wedge engaging within recesses along the sides of the bearing. A pair of oppositely projecting lugs $g^8$, $g^8$ are also provided on the opposite sides of the wedge which depend downwardly into close relation with the pair of oppositely projecting lugs $f^8$, $f^8$ on the opposite sides of the journal bearing.

My invention may also be embodied in other convenient and practical forms, in which the wedge and journal bearing may be varied in form and in their method of engagement with each other, and in which the rollers may be inserted, removed and supported either independently of each other, or in a common carriage or cage.

From the foregoing description it will be observed that I have invented an improved journal box for car trucks which is supported upon the axle journal in a manner to permit a relative lateral movement and thereby form a lateral yielding connection between the car body and wheels so as to prevent excessive wear or injury to the wheel flanges when the car body is subjected to a motion lateral of the rails. It will be further observed that I have invented an improved journal box which is supported through interposed rollers upon the journal bearing so as to be capable of slight lateral movement relatively to the journal bearing and at the same time subjected to a lifting action so as to absorb the lateral movement of the car body relatively to the rails and prevent transmission of such movement directly to the wheel flanges. It will be further evident that I have invented an improved journal box conforming to the M. C. B. requirements as to vertical play between the axle and journal box, and in other respects, and which at the same time is capable of containing a greater quantity of lubricating oil than heretofore possible.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

The combination with a journal box, of an axle journal, a journal bearing wedge, a journal bearing mounted upon the axle journal and underlying said wedge, the under surface of the top wall of the journal box and the upper surface of said wedge having opposed concave roller seats, rollers interposed between the journal box and said wedge and located in said opposing concave seats, a cage in which said rollers are journaled, the inner surfaces of the side walls of the journal box having shoulders thereon for supporting said cage in a position to disengage the rollers from the concave seats in the journal box when the journal box is lifted relatively to the axle.

In testimony whereof, I have subscribed my name.

FRANKLIN L. BARBER.

Witnesses:
GEO. L. WILKINSON,
HENRY A. PARKS.

Copies of this patent may be obtained for five cents each, by addressing the "Commissioner of Patents, Washington, D. C."